United States Patent [19]
Coppinger et al.

[11] Patent Number: 6,026,292
[45] Date of Patent: Feb. 15, 2000

[54] TRUCK COMMUNICATION SYSTEM

[75] Inventors: James B. Coppinger; Robert V. Helms, both of Chattanooga, Tenn.; Thomas F. Doyle, San Diego, Calif.

[73] Assignees: Qualcomm Incorporated, San Diego, Calif.; Transcommunications, Inc., Chattanooga, Tenn.

[21] Appl. No.: 08/914,102

[22] Filed: Aug. 19, 1997

[51] Int. Cl.[7] .................................................. H04Q 7/20
[52] U.S. Cl. ............................ 455/406; 455/405; 455/406
[58] Field of Search .................................. 455/38.1, 38.4, 455/345, 517, 227, 228, 410, 405, 406, 407, 12.1, 560, 426, 408, 412, 413, 422, 415; 379/93.24; 705/30, 40, 400

[56] References Cited

U.S. PATENT DOCUMENTS

| | | | |
|---|---|---|---|
| 4,901,307 | 2/1990 | Gilhousen et al. | 370/18 |
| 4,979,170 | 12/1990 | Gilhousen et al. | 455/12.1 |
| 5,020,077 | 5/1991 | Rhodes | 375/8 |
| 5,142,278 | 8/1992 | Moallemi et al. | 340/825.06 |
| 5,404,568 | 4/1995 | Yamagishi | 455/12.1 |
| 5,479,475 | 12/1995 | Grob et al. | 379/58 |
| 5,535,430 | 7/1996 | Aoki et al. | 455/12.1 |
| 5,608,722 | 3/1997 | Miller | 370/320 |
| 5,613,196 | 3/1997 | Barnes et al. | 455/15 |
| 5,758,088 | 5/1998 | Bezaire et al. | 395/200.62 |
| 5,774,802 | 6/1998 | Tell et al. | 455/406 X |
| 5,778,313 | 7/1998 | Fougnies | 455/408 |

*Primary Examiner*—Wellington Chin
*Assistant Examiner*—Yemane Woldetatios
*Attorney, Agent, or Firm*—Luedeka, Neely & Graham PC

[57] ABSTRACT

A system and method for sending e-mail messages between an authorized user connected to a publicly accessible computer network system and a vehicle occupant using a private communication system having different messaging formats. E-mail messages are received by an interface, converted into an appropriate format, and transmitted to an intended user or vehicle occupant if a sufficient balance exists in an account associated with the vehicle occupant.

15 Claims, 9 Drawing Sheets

TRUCK COMMUNICATION SYSTEM

FIELD

The present invention relates to communication systems, and more particularly to a communication system and method for interfacing a public communication system with a mobile private communication system.

BACKGROUND

Operators of over-the-road vehicles, such as truck drivers, are often contacted while in transit by a dispatcher at a base station, who has been asked to relay a personal message. The trucking company typically has a private communication system (such as CB, shortwave radio, satellite, or other mobile communication system), so that it can contact the truck driver for company business while the truck is on the road. Relaying personal messages to the truck driver may be a severe burden on the dispatcher, who may receive many such personal messages to relay to many different truckers. Also, the dispatcher at the base station may fail to relay an urgent message to the truck driver or fail to deliver the urgent message on a timely basis. Thus, it is often difficult for someone to get a personal message to the truck driver.

The truck driver typically cannot use the private communication system to reach the party who has sent the personal message. If the message is urgent, such as "call home immediately," the truck driver must search for a pay phone, which may be miles away. Once at the pay phone, the driver often must search for change or a phone card to return the call, and may encounter busy signals or have to leave a message because the person trying to contact the truck driver is not present. These inconveniences result in lost time to the fleet and the truck driver, who is typically trying to reach a destination within a set time period.

The problem with the present system is that there is no way for the truck driver to use the private communication system to contact the other person over the public communication system, without having the dispatcher physically relay the message between the private communication system and the public communication system. Similarly, there is no way for the other person to use the public communication system to contact the truck driver over the private communication system, without again having the dispatcher physically relay the message between the public communication system and the private communication system.

SUMMARY

The above difficulties and disadvantages of the prior art are overcome by a system for sending an e-mail message between an authorized user and a truck driver. An electronic means creates and provides a first e-mail message with an associated address and identification number. A publicly accessible computer network system receives the first e-mail message from the electronic means, and relays the first e-mail message.

An interface receives the first e-mail message from the publicly accessible computer network system with receiving means. Accounting means adjust an account associated with the identification number. The first e-mail message is translated into a format compatible with a private mobile communication system with translation means, and transmitting means provide the first e-mail message to the private mobile communication system.

The private mobile communication system receives the first e-mail message from the interface transmitting means, and sends the first e-mail message to a mobile terminal, which receives and displays the first e-mail message. The mobile terminal further creates a second e-mail message and provides it to the private mobile communication system. The second e-mail message also includes the identification number. The private mobile communication system receives the second e-mail message from the mobile terminal, and sends it to the interface transmitting means.

The interface transmitting means receives the second e-mail message from the private mobile communication system and sends it to the interface translation means, which receives it and translates it into a format compatible with the publicly accessible computer network system, and sends the second e-mail message to the interface receiving means. The interface accounting means adjusts the account associated with the identification number. The interface receiving means receives the second e-mail message from the interface translation means, and provides the second e-mail message to the publicly accessible computer network system, which receives it and provides it to the electronic means. The electronic means receives the second e-mail message from the publicly accessible network system and displays the second e-mail message.

Other objects, features and advantages will become apparent by reference to the following detailed description when considered in conjunction with the accompanying drawings.

DETAILED DESCRIPTION

Figure 1:
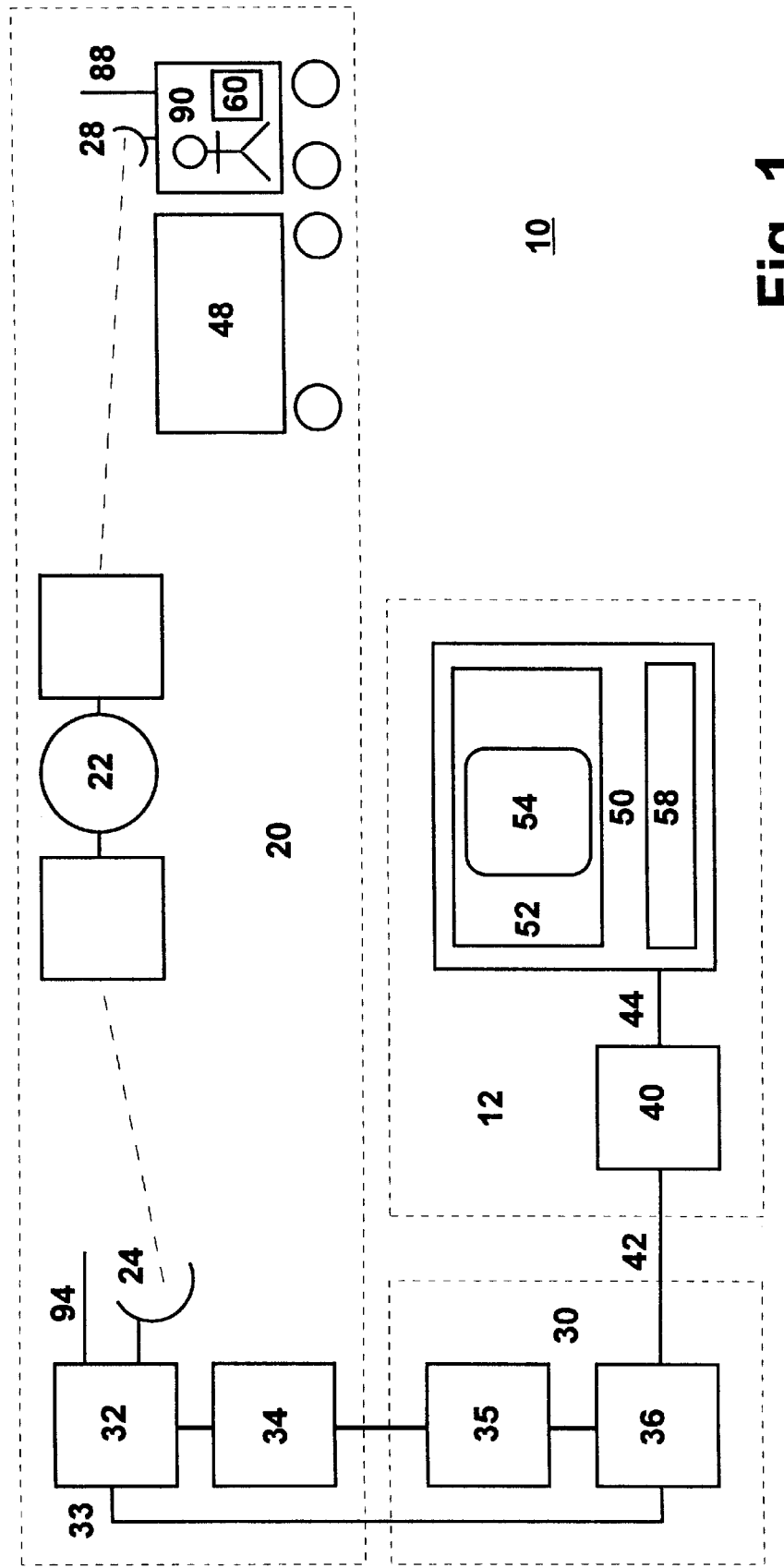
FIG. 1 depicts a communication system for interfacing a public communication system with a mobile private communication system.

Commencing with FIG. 1, a communication system 10 for interfacing and transmitting messages between a public communication system 12 and a mobile private communication system 20 is shown. The private communication system 20 includes a communication device such as a satellite dish 28 or preferably an antennae 88, which is mounted in a plurality of vehicles, such as a fleet of semi-trailers or trucks 48. The satellite dish 28 or antennae 88 is connected to a mobile terminal 60, which can be cellular based, but is preferably satellite based for transmitting messages to, and receiving messages from, a satellite 22. The mobile terminal 60 is discussed in greater detail below. The satellite 22 sends and receives messages to and from a satellite dish 24 or antennae 94, which is in communication with a satellite hub 32, which processes the messages sent to and from the satellite 22 into computer readable form. Further included in the satellite hub 32 is a satellite network interface for communicating with the satellite 22.

A fleet computer system 34 is also a part of the private mobile communication system 20. The fleet computer system 34 is typically located at the headquarters or dispatch center for a trucking company. The fleet computer system 34 is connected to an interface 30, which contains means for interfacing the public communication system 12 to the private communication system 20. The fleet computer system 34 is connected to a remote management system 35, which is a part of the interface 30. However, the remote management system 35 preferably resides as a software routine on the fleet computer system 34, and is added to the fleet computer system 34 to implement the method.

The remote management system 35 is in communication with a local management system 36. Preferably, the local management system 36 physically resides at a location apart from the fleet computer system 34, and may be in communication with many remote management systems 35 and fleet computer systems 34. The local management system 36 is in communication with the public communication system 12, such as with a publicly accessible computer network system like the Internet 40, via line 42. Some fleet computer systems 34 may not be able to host the remote management system 35, and thus would not be able to communicate with the local management system 36. In this event, the satellite hub 32 would be in direct communication with the local management system 36, such as by line 33.

Each of the trucks 48 is operated by a truck driver 90 who may either send or receive a message over the private mobile communication system 20, and is thus either a private sender or a private recipient of a message. The truck driver 90 has a unique identification number and an account, such as a sum of money, associated with the unique identification number. A set amount of money can be adjusted in the account each time the truck driver 90 sends or receives a message between the private communication system 20 and the public communication system 12. The adjustment may be in the form of a debit for use of the interface 30, or may be a credit in the event of an overcharge, special promotion, deposit, or other event. Preferably, the local management system 36 administers the account.

The account is replenishable in a number of different ways. For example, the debits to the account can be deducted from the truck driver's payroll account. This can be done by transmitting information from the local management system 36 to the remote management system 35, which is in communication with the fleet computer system 34. Preferably, the fleet computer system 34 has access to the payroll account of the truck driver 90. Thus, the local management system 36 can request and receive authorization for an adjustment to the payroll account of the truck driver 90. This adjustment may be a debit, such as a one-time debit of a given amount of money, or a weekly debit of a given amount of money.

The account can also be replenished by automatically debiting the credit card of the truck driver 90. Further, the truck driver 90 may be required to keep a certain amount of money in the account in order to send and receive messages, which amount could be deposited in the account by any one of a number of payment methods, such as money transfer, personal check, money order, or credit card. The truck driver 90 could also replenish the account by sending a message to the fleet computer system 34 requesting a loan or transfer. Further, the account may be a credit account with a preset limit, against which the truck driver 90 may draw. The truck driver 90 can then be billed, such as monthly, for the debited amount of the account.

Thus, the truck driver 90 pays for the ability to send and receive messages between the private mobile communication system 20 and the public communication system 12. This payment may be on either a prepaid basis or a post-paid basis by reducing a balance in a prepaid account, debiting a declining balance account, drawing against a prepaid account, charging a credit card account, drawing against a payroll advance, drawing against payroll, or accumulating charges and sending an invoice for payment. Preferably, the local management system 36 provides the cost accounting means to administer the account associated with each unique identification number whenever a message is transmitted to or received from the mobile terminal 60.

Typically, a given mobile terminal 60 will remain associated with a given truck 48, while many different operators 90 may operate the truck 48 and mobile terminal 60 from time to time. Thus, there is preferably a registration method for associating the driver's identification number, also referred to as an administration number or user ID, with the identification number of the mobile terminal 60. This registration procedure is most preferably done at the mobile terminal 60 by the driver 90, such as by entering the user ID during a registration, or log-on, procedure. Once the identification number of the driver 90 is associated with the identification number of the mobile terminal 60, the various elements of the system will know which truck 48 and mobile terminal 60 the messages containing the driver 90's identification number should be routed to.

Thus, a driver 90 may log on and off of different mobile terminals 60 over a period of time, and the messages to the driver 90 will always be properly routed. The driver 90 may log off of a given mobile terminal 60 without immediately logging back on to the same or a different mobile terminal 60. In this case, the messages to be sent to the driver 90 will be stored for at least a given length of time, and will be then sent to the proper mobile terminal 60 at such time that the driver 90 logs back on to the system.

The communication system 10 further allows an e-mail message over the Internet 40 to be sent to the mobile terminal 60. An electronic means, such as computer 50, connected to the Internet 40 via line 44, has a keyboard 58 and a display 52 for presenting messages 54. A person seeking to send a message to the truck driver 90 may send an e-mail message via the computer 50 by using the unique identification number of the truck driver 90 associated with an e-mail address, and sending the e-mail message over the Internet 40, through the interface 30, to the satellite 22, and finally to the mobile terminal 60.

It is possible that an unauthorized user may acquire the identification number of the truck driver 90, and use the identification number to send unwanted e-mail messages, such as advertisements or harassing messages, to the truck driver 90. This would cause the truck driver 90's account to be charged for the messages, resulting in unwanted expenses to the truck driver 90. To prevent such occurrences, the truck driver 90 may preferably enter a code, such as an alphanumeric string, into the mobile terminal 60. The code is selectable by the truck driver 90, and can be changed at any time. Upon entering the code, the system checks e-mail messages being routed to the truck driver 90 for the same code.

If the e-mail message does not contain the code, such as in the subject line of the message, then the system assumes that the e-mail is an unauthorized transmission. The system can be programmed to perform one or more of several different actions at this point, such as either store the message, alert the truck driver 90 and request instructions, or automatically delete the message. The truck driver 90 may also remove the code, so that all e-mail messages are routed to him. In this manner, the truck driver 90 has some control over which e-mail messages he receives and is charged for, and who can send those e-mail messages.

Figure 2:
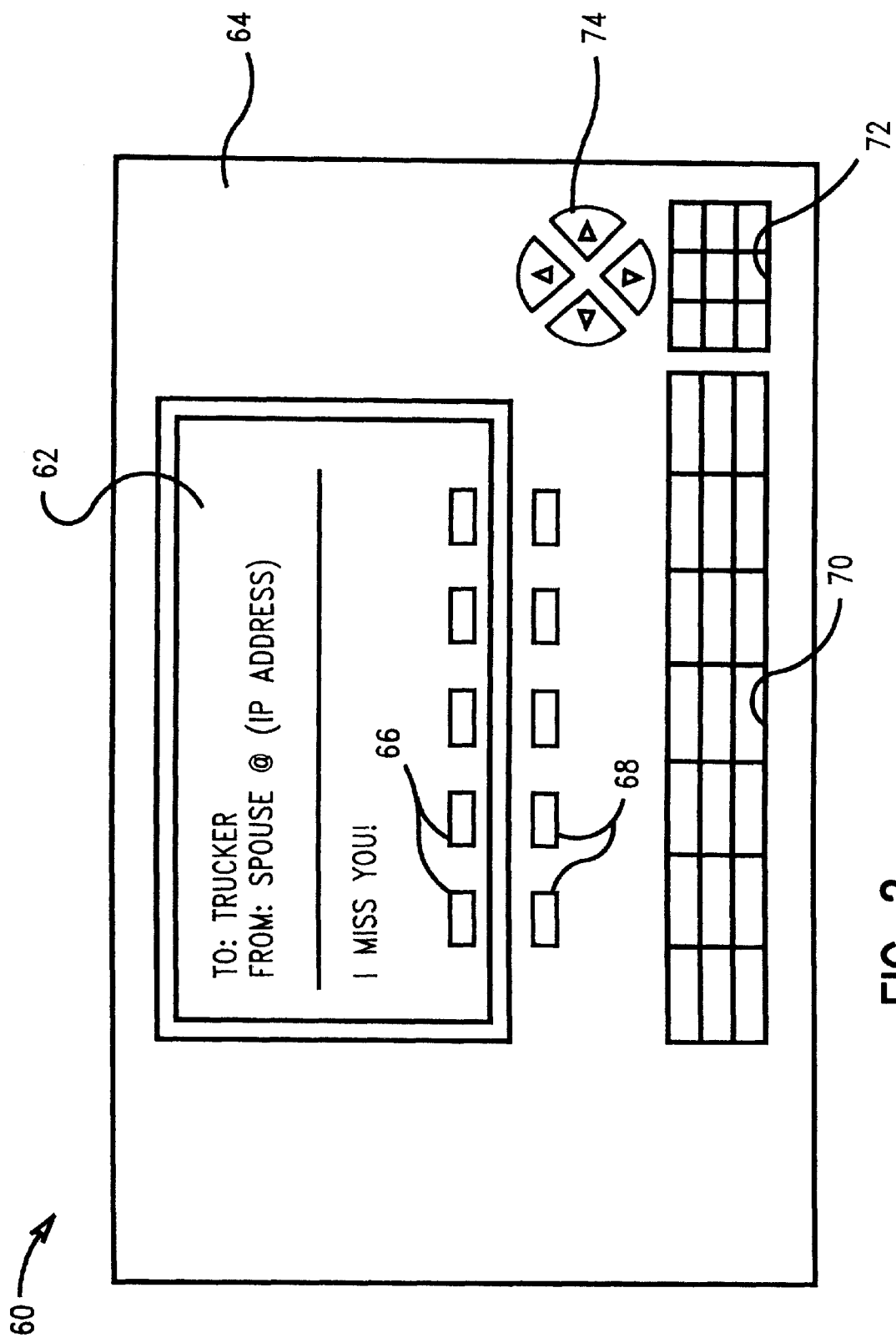
FIG. 2 depicts a mobile terminal.
Figure 3:
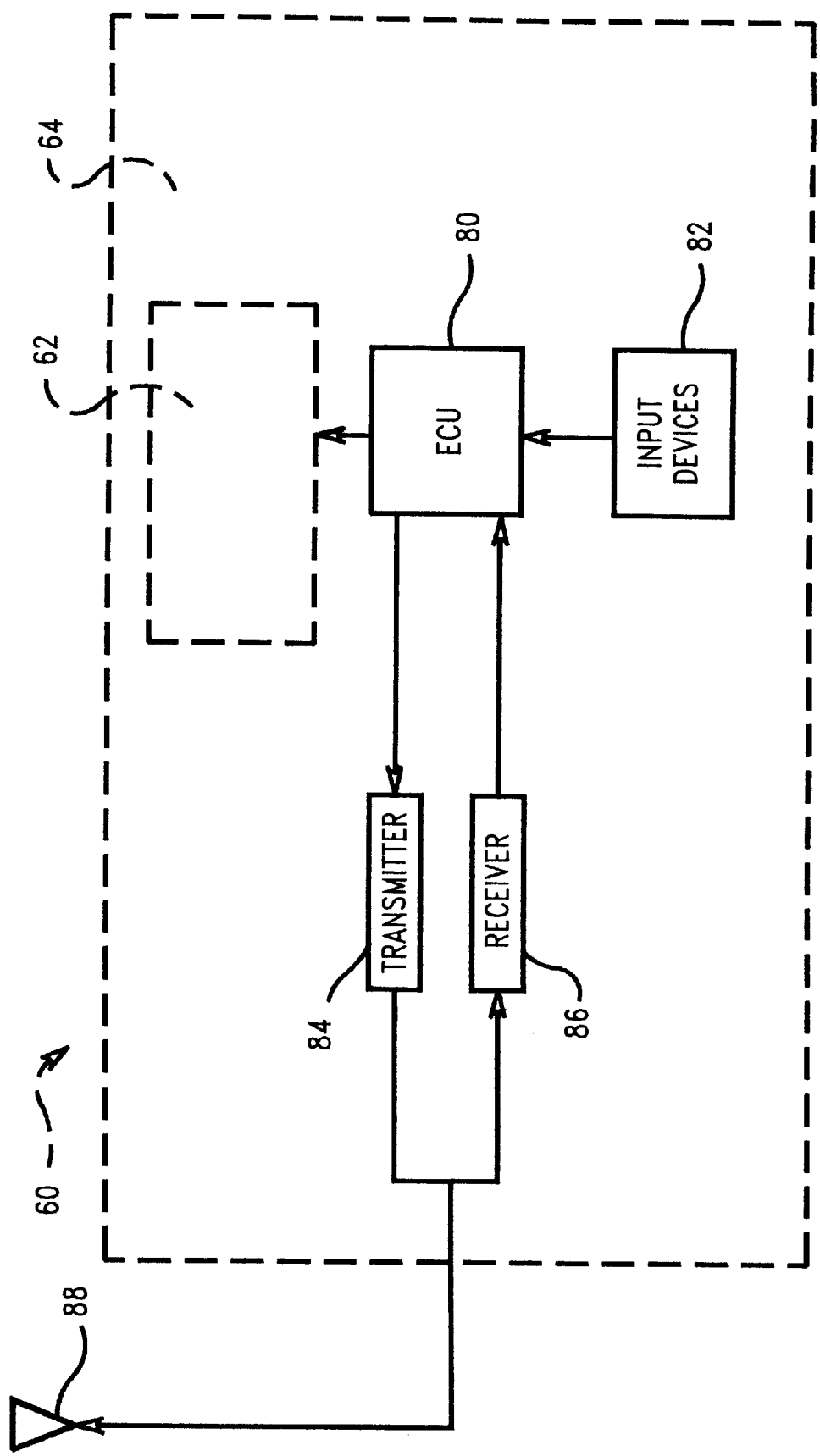
FIG. 3 is a circuit schematic of the mobile terminal.

The mobile terminal 60 is shown in greater detail in FIGS. 2 and 3. The mobile terminal 60 includes a display 62 for displaying the e-mail message sent from the computer 50.

Shown on display 62 are a plurality of function indices 66 for prompting the truck driver 90, and which correspond to associated panel buttons 68. Further provided on mobile terminal 60 is an alpha keypad 70 and a numeric keypad 72. A cursor controlled device 74 is also mounted on display 62 for guiding a cursor around display 62.

As shown in FIG. 3, the mobile terminal 60 disposed in the truck 48 includes an electronic control unit 80 that has memory (volatile and non-volatile), bus lines (address, control and data) and other hardware, software, and firmware required for manipulation of the messages sent to and from the mobile terminal 60. In communication with the electronic control unit 80 are the input devices 82, which include the alpha keypad 70, numeric keypad 72, and cursor control device 74. Also in communication with the electronic control unit 80 is a receiver 86 for receiving the messages from the antennae 88 or satellite dish 28. The mobile terminal 60 also includes a transmitter 84, which transmits the messages from the mobile terminal 60 to the antennae 88 or satellite dish 28 and then to satellite 22. The transmitter 84 and the receiver 86 may be contained in a single transceiver unit having the functions and capabilities of each.

Figure 4:
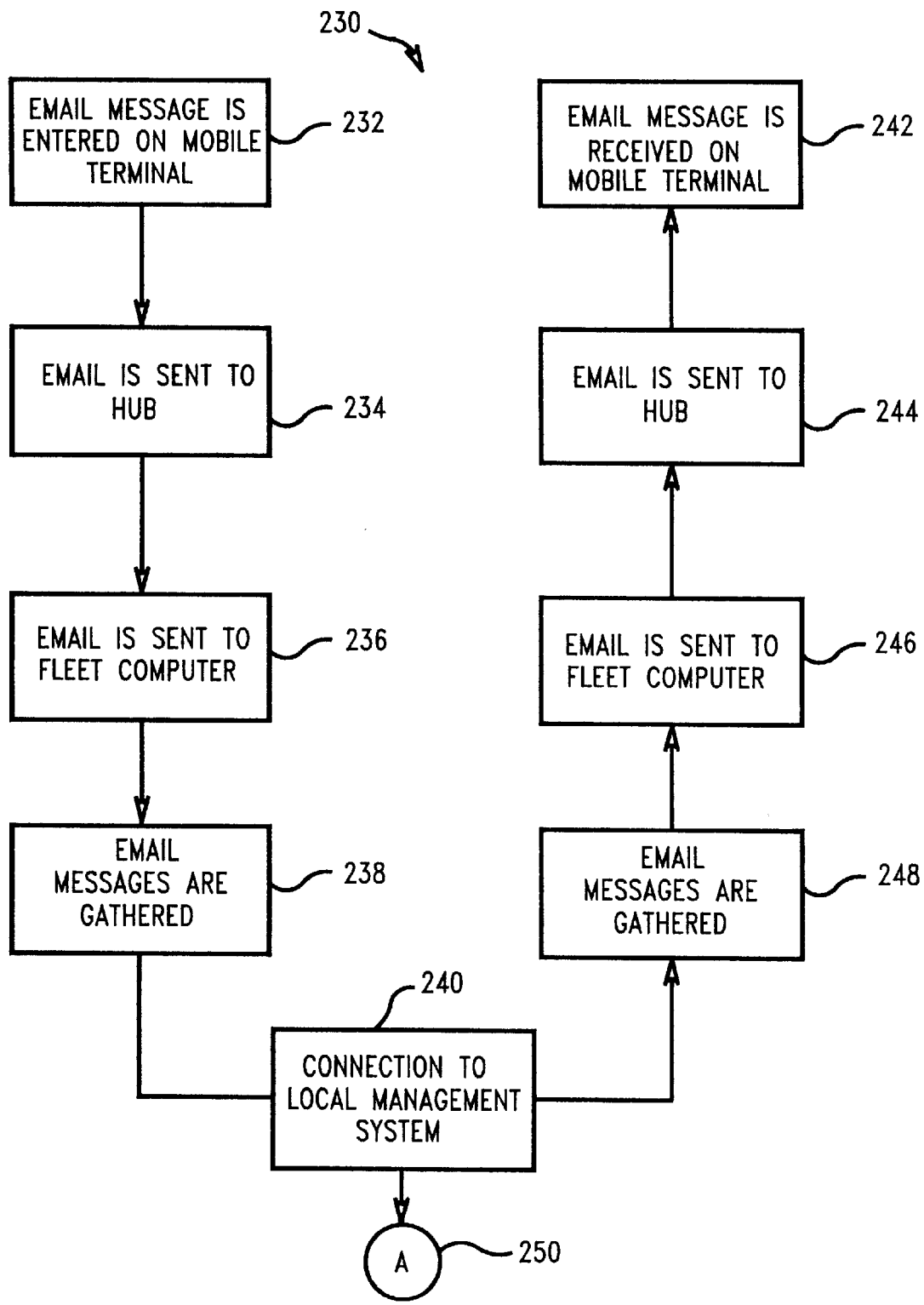
FIGS. 4A–4F are flow charts showing method steps.

Referring now to FIG. 4A, there is depicted system 230 for exchanging messages from a public communication system, which is the Internet 40. One portion of the method 230 starts in task block 232 wherein an e-mail message is entered on the mobile terminal 60 disposed in the truck 48. The method then continues to task block 234 whereby the e-mail message is sent to the satellite 22 and transmitted to the interface 30. The method then continues to task block 236 whereby the e-mail message is received by the satellite network interface 32 and converted into or routed to an e-mail typed message format. The method then continues to task block 238 whereby the e-mail messages are gathered from the various fleets of trucks 48 and the method continues to task block 240 whereby a dial out connection via a modem, or a direct connection to the fleet computer system 34 is made. The method then continues to circle 250, which is continued in FIG. 4B.

The method then continues to task block 266 whereby the e-mail message is read by the fleet computer system 34. The method then continues to task block 268 whereby an address block of the e-mail message is checked to determine whether a unique identification number of the truck driver 90 has been input, which also continues in decision block 270. If one of the unique identification numbers has not been input, an invalid user identification message is sent back to the truck driver 90 in task block 272 and the method continues to circle 250, which is continued in FIG. 4A. At this time, the returned e-mail message along with other e-mail messages for a particular trucking fleet are gathered in task block 248, depicted in FIG. 4A, and the method continues to task block 246 whereby the e-mail messages are routed as e-mail typed messages. The method then continues to task block 244 whereby the e-mail is sent from the fleet computer system 34 to the satellite network interface 32 and transmitted to the satellite 22. The method then moves to task block 242 whereby each e-mail message is sent from the satellite 22 to one of the mobile terminals 60.

Figure 4B:
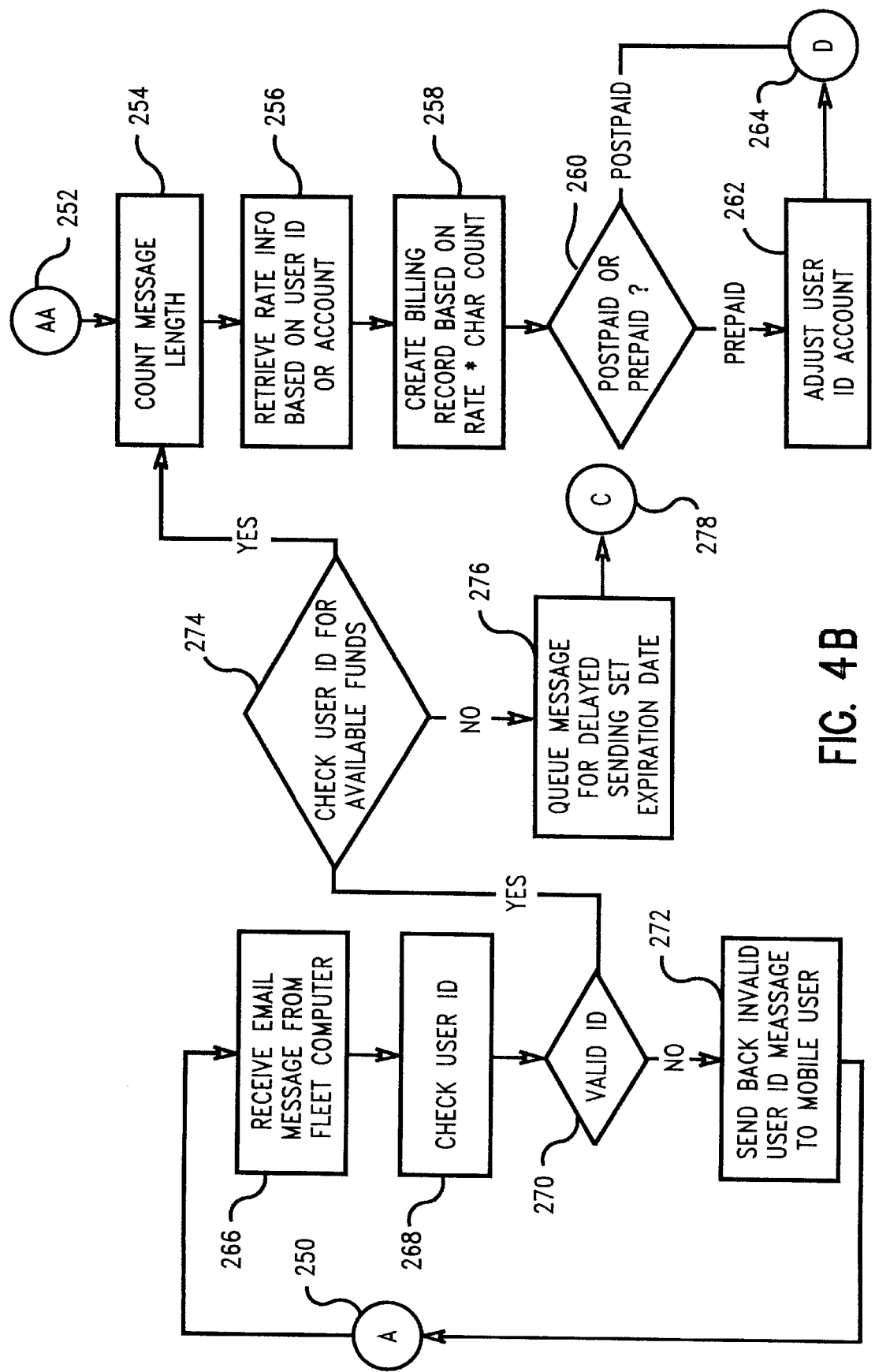

If, however, it is determined in decision block 270 of FIG. 4B that a valid identification number is being used, the method continues to decision block 274 whereby the account associated with the unique identification number is checked to determine whether sufficient money exists therein. If it does not, the method continues to task block 276 whereby the e-mail message is delayed for sending at a later time and an expiration date is set for the message. The method then continues to circle 278.

If, however, it is determined in decision block 274 that a sufficient sum of money is available in the account of the truck driver 90, or if the account can be automatically replenished as described above, the method continues to task block 254 whereby the length of the e-mail message is counted by the fleet computer system 34. The method then continues to task block 256 whereby billing rate information based on the unique identification number or account of the truck driver 90 is retrieved. The method then continues to task block 258 whereby a e-mail length-dependent billing record is created based on the billing rate multiplied by the character count of the e-mail message.

The method then continues to decision block 260 whereby it is determined whether the account of the truck driver 90 is a postpaid or a prepaid account. If the account is postpaid, the method continues to circle 264. If, however, it is determined that the account is a prepaid account, the method continues to task block 262 and the multiplied amount of the billing rate and character count is deducted from the sum of money in the account of the truck driver 90. The method then continues to circle 264.

Figure 4C:
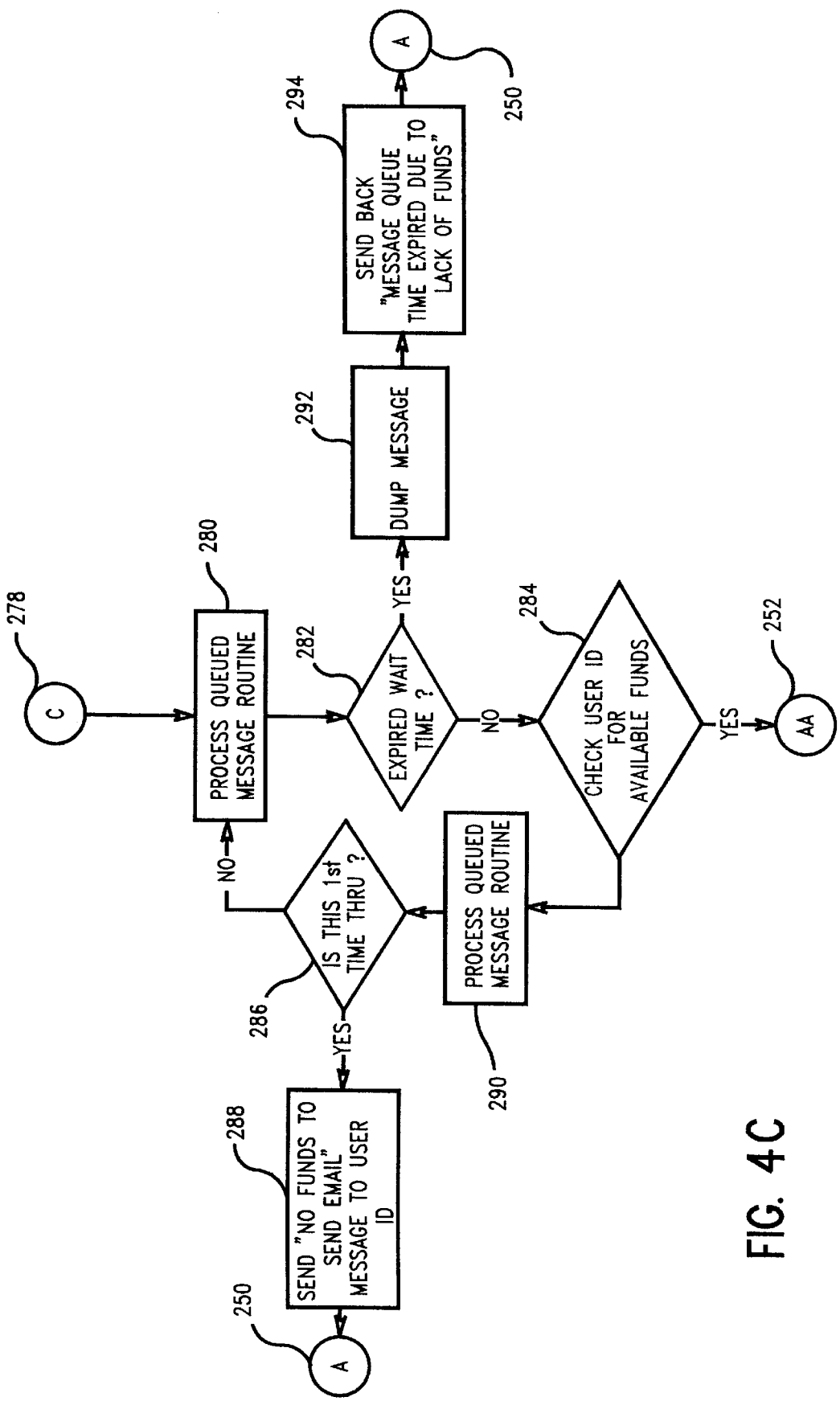
Figure 4D:
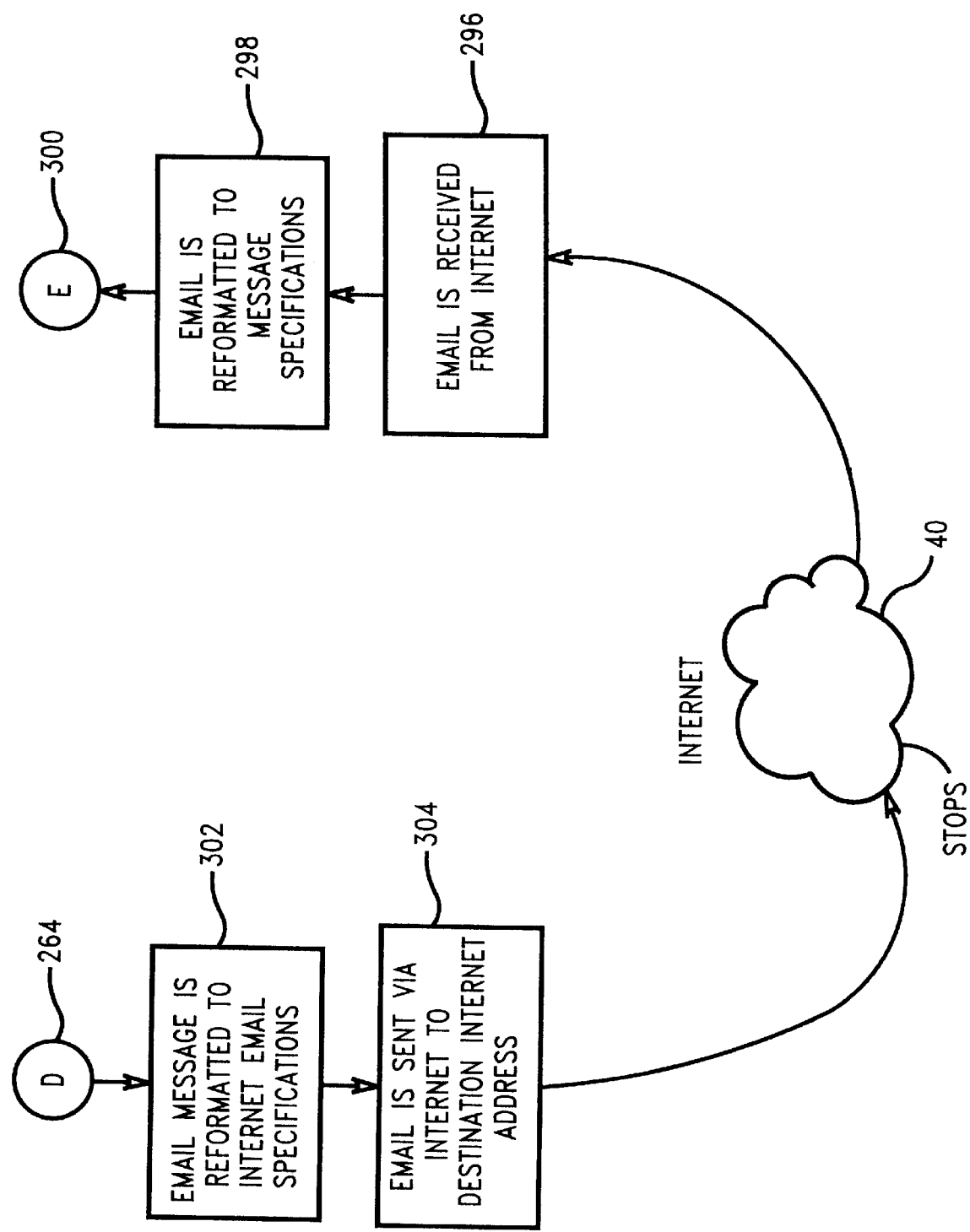

Referring now to FIG. 4D, circle 264 continues to task block 302 whereby the e-mail message is reformatted to Internet e-mail specifications. The method then continues to task block 304 whereby the e-mail message is sent over Internet line 42 to the Internet 40, over line 44 and to the computer 50.

Now, considering the situation when an operator of the computer 50 seeks to send the e-mail message over line 44 to the Internet 40. As shown in FIG. 4D, the method continues to task block 296 whereby the e-mail message is received from the Internet 40 and is formatted according to the message specifications for the private communication system in task block 298. The method then continues to circle 300, which continues at FIG. 4E at task block 306. In this task block, the method converts the e-mail message into the unique identification number for the truck driver 90 that the e-mail message is being sent to.

The method then continues to decision block 308 whereby it is determined by the fleet computer system 34 whether the identification number is valid. If it is not, the method continues to task block 310 whereby an invalid address message is sent to the operator of the computer 50 and the method continues to circle 264, which is shown in FIG. 4D. If, however, it is determined in decision block 308 that the identification number is valid, the method continues to decision block 312 whereby the account associated with the identification number is checked to determine whether a sufficient sum of money exists therein. If it does not, the method continues to task block 314 whereby the e-mail message is cued for later sending and an expiration date is attached to the e-mail message. The method then continues to circle 316.

If, however, it is determined at decision block 312 that the account associated with the unique identification number has a sufficient sum of money, or if the account can be automatically replenished as described above, the method continues to task block 320 whereby the length of the e-mail message is counted, and then the method continues to task block 322 whereby billing rate information based on the identification number or account of the truck driver 90 is retrieved from the fleet computer system 34. The method then continues to task block 324 whereby a billing record based upon the billing rate and multiplication of the character count of the e-mail message is created. The method then continues to decision block 326 whereby it is determined whether the truck driver 90 has a postpaid or a prepaid account. If the account is postpaid, the method continues to circle 250. If, however, the account is prepaid, the method continues to task block 328 whereby the multiplication of the billing rate and character count of the e-mail message is deducted from the sum of money and the truck driver 90's account and the method then continues to circle 250, which is then continued on FIG. 4A.

Figure 4E:
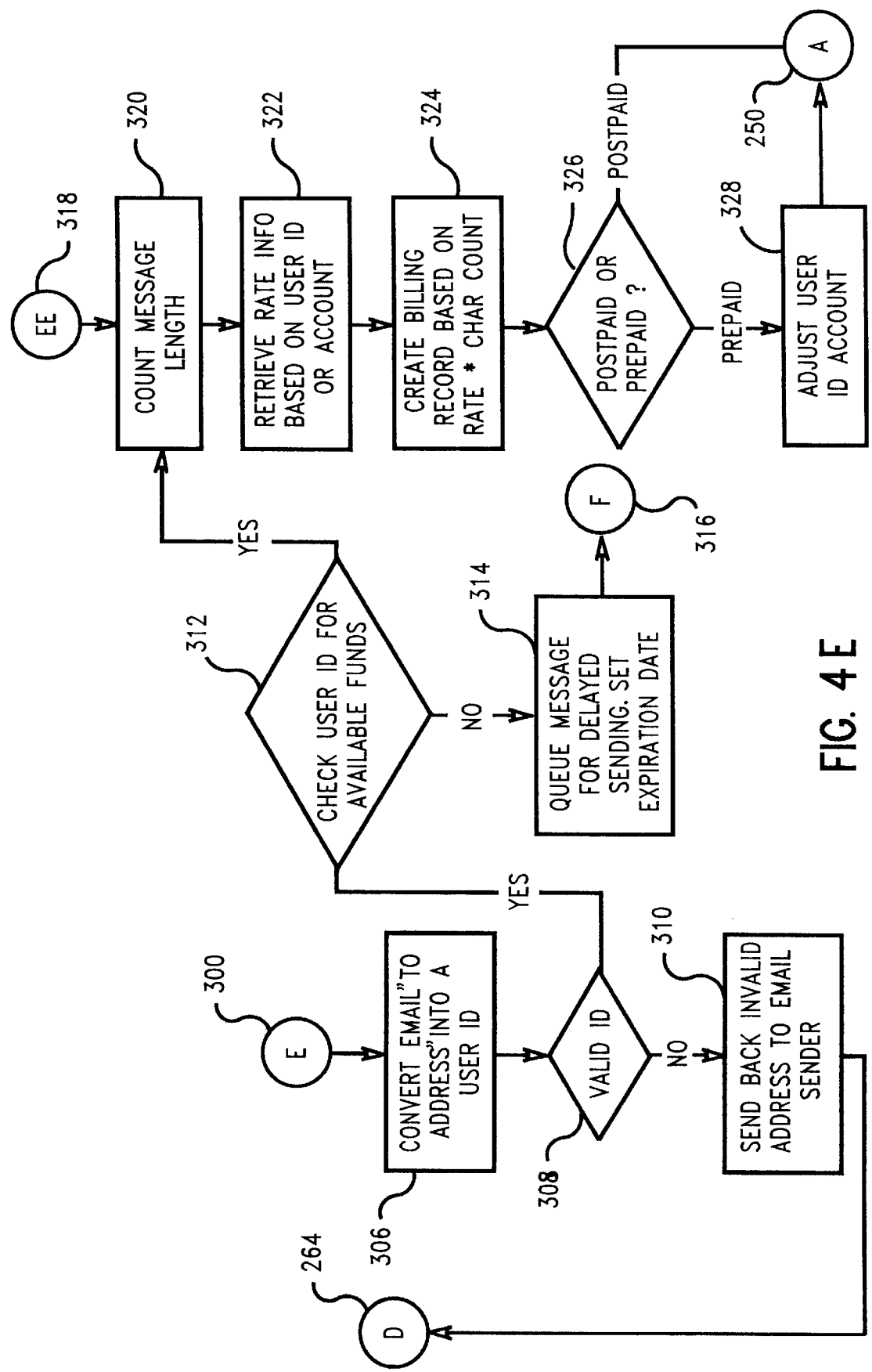
Figure 4F:
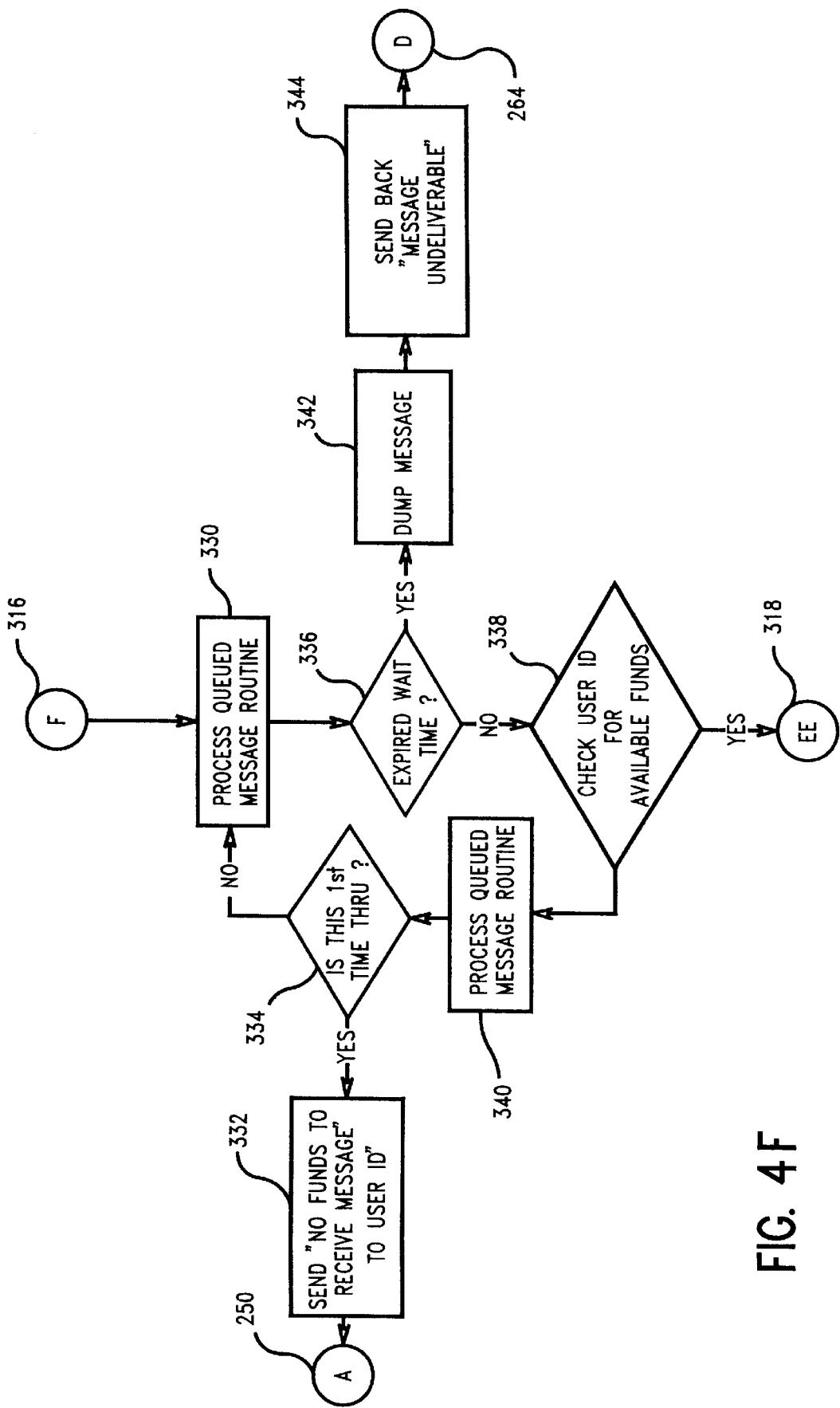

Referring to circle 316, from FIG. 4E and continued in FIG. 4F, the method then continues to task block 330 whereby the cued e-mail message routine is implemented by the fleet computer system 34, and other e-mail messages waiting to be sent to the truck driver 90 are placed in order. The method then continues to decision block 336 whereby it is determined whether the wait time for the cued e-mail message has expired. If the time has expired, the method continues to task block 342 whereby the e-mail message is deleted, and then continues to task block 344 whereby a "message undeliverable" is sent back to the operator of the computer 50. The method then continues to circle 264. If, however, it is determined in decision block 336 that the wait time has not expired, the method continues to decision block 338 whereby the account of the truck driver 90 is checked to determine whether sufficient money exists therein. If the account contains sufficient funds, then the method continues to circle 318, which is continued in FIG. 4E as discussed above.

If, however, the account of the truck driver 90 does not have sufficient money therein, the method continues to task block 340 whereby the cued message routine is again processed as in task block 330. The method then continues to decision block 334 whereby it is determined whether it is a first pass through the method. If it is, the method continues to task block 332 whereby the message "no funds to receive message" is sent to the truck driver 90. The method then continues to circle 250, which is continued in FIG. 4A. If, however, it is determined in decision block 334 that it is not the first time through the method, the method continues back to task block 330 and further waits for the truck driver 90 to transfer more money to the account is continued.

Referring back to circle 278, which continues from FIG. 4B to FIG. 4C, the method then continues to task block 280 whereby the e-mail message trying to be sent from the truck driver 90 is cued via a messaging routine in the fleet computer system 34. The method then continues to decision block 282 whereby it is determined whether the wait time for the e-mail message has expired. If it has, the method continues to task block 292 whereby the message is deleted and the message continues to task block 294 whereby a "message cue time expired due to lack of funds" message is sent back to the truck driver 90. The method then continues to circle 250, which continues in FIG. 4A.

If, however, it is determined in decision block 282 that the wait time has not expired for the e-mail message, the method continues to decision block 284 whereby the account associated with the identification number of the truck driver 90 is checked to determine whether sufficient money exists therein. If it does, the method continues to circle 252, which is continued in FIG. 4B. If, however, it is determined in decision block 284 that sufficient money does not exist in the account of the truck driver 90, the method continues to task block 290 whereby the message is cued again as in task block 280. The method then continues to decision block 286 whereby it is determined whether it is the first time through the method. If it is, the method continues to task block 280 whereby a message "no funds to send e-mail" is sent back to the truck driver 90. The method then continues to circle 250, which is continued in FIG. 4A. If, however, it is determined that it is not the first time through the method in decision block 286, the method continues back to task block 280.

While the description has been given in detail, it will be apparent to persons skilled in the relevant art that modifications may be made without departing from the spirit of the disclosure. Therefore, the above mentioned description is to be considered exemplary, rather than limiting, with the true scope defined in the following claims.

What is claimed is:

1. A system for sending e-mail messages between an authorized user connected to a publicly accessible computer network system and a vehicle occupant using a private communication system having different messaging formats, comprising:

an interface for sending e-mail messages between said publicly accessible computer network system and said private communication system, each of said e-mail messages comprising a message and at least an identification number corresponding to a vehicle occupant;

accounting means for adjusting an account associated with said vehicle occupant prior to sending said e-mail messages to said authorized user or to said vehicle occupant;

translation means for converting said e-mail messages from a format compatible with said publicly accessible computer network system into a format compatible with said private communication system and for converting said e-mail messages from a format compatible with said private communication system into a format compatible with said publicly accessible computer network system; and means for transmitting and receiving said e-mail messages to and from a mobile communication terminal located on a vehicle.

2. The system of claim 1 wherein the accounting means comprises:

means for determining an account balance associated with each of said e-mails; and means for preventing an e-mail message from being delivered if said account balance corresponding to said e-mail message lacks at least a predetermined balance.

3. The system of claim 1 wherein said accounting means comprises means for adjusting a credit card account associated with said vehicle occupant.

4. The system of claim 1 wherein said accounting means comprises means for adjusting a payroll account associated with said vehicle occupant.

5. The system of claim 1 wherein said mobile terminal is further for allowing said vehicle occupant to register with said private communication system.

6. The system of claim 1 further comprising means for storing said e-mail messages if said e-mail messages are not delivered to said vehicle occupant or to said authorized user.

7. The system of claim 1 further comprising means for entering a code by said vehicle occupant, said code for preventing unwanted e-mail messages from being delivered to said vehicle occupant.

8. A method for sending e-mail messages between an authorized user connected to a publicly accessible computer network system and a vehicle occupant using a private communication system having different messaging formats, comprising the steps of:

receiving an e-mail message by an interface, from either said authorized user or from said vehicle occupant, said e-mail message comprising a message, and at least an identification code corresponding to said vehicle occupant;

determining if a sufficient balance exists in an account associated with said vehicle occupant prior to sending said e-mail message to said authorized user or to said vehicle occupant;

adjusting said account by a predetermined amount;

converting said e-mail message to a format compatible with said publicly accessible computer network system if said e-mail message originated from said private communication system;

converting said e-mail message to a format compatible with said private communication system if said e-mail message originated from said publicly accessible computer network system;

transmitting said converted e-mail message to a mobile communication terminal associated with said vehicle occupant if said converted e-mail message originated from said publicly accessible computer network; and sending said converted e-mail message to said publicly accessible computer network if said e-mail message originated from said private communication system.

9. The method of claim 8 wherein the step of adjusting said account by a predetermined amount comprises the step of subtracting an amount proportional to a length of said e-mail message.

10. The method of claim 8 wherein the step of adjusting said account by a predetermined amount comprises the step of subtracting an amount equal to at least a billing-rate multiplied by a character count of said e-mail message.

11. The method of claim 8 further comprising the step of:

storing said e-mail message for a predetermined amount of time if said balance is not greater or equal to a predetermined amount.

12. The method of claim 8 further comprising the step of:

determining if said account is a prepaid account or a postpaid account;

billing said account if said account is a postpaid account.

13. The method of claim 8 further comprising the steps of:

entering a code by a vehicle occupant, said code for preventing unauthorized e-mail from being transmitted to said mobile communication terminal;

checking said e-mail message for said code; and preventing said e-mail message from being transmitted to said mobile communication terminal if said e-mail message does not comprise said code.

14. The method of claim 13 further comprising the step of:

storing said e-mail message if said code has been entered and said e-mail message does not comprise said code.

15. The method of claim 13 further comprising the step of:

alerting said vehicle occupant that an unauthorized e-mail message was received by said private communication system if said code has been entered by said vehicle occupant and said e-mail message does not comprise said code.

* * * * *